Patented July 24, 1951

2,561,689

UNITED STATES PATENT OFFICE 2,561,689

SPIROTHIOBARBITURIC ACIDS

Wilbur J. Doran and Earle M. Van Heyningen, Indianapolis, Ind., assignors to Eli Lilly and Company, Indianapolis, Ind., a corporation of Indiana No Drawing. Application March 19, 1949, Serial No. 82,485

8 Claims. (Cl. 260—260)

This invention relates to certain new spiro thiobarbituric acid compounds and their preparation.

The new thiobarbiturate compounds of this invention contain a substituted cyclopentane ring as a spiro grouping attached to the 5'-position of the thiobarbituric acid nucleus. The new compounds have low toxicity, and possess useful sedative and hypnotic properties in that they are effective in small doses and produce an anesthesia of short duration.

The new compounds are the acids and salts which may be represented by the formula

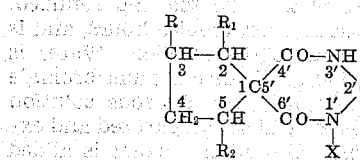

in which R is a member of the group consisting of hydrogen and methyl, and $R_1$ and $R_2$ are members of the group consisting of methyl and ethyl; and R is hydrogen when both $R_1$ and $R_2$ are ethyl; and R is methyl when both $R_1$ and $R_2$ are methyl; and in which X represents hydrogen when the compound is an acid, and represents a metallic salt-forming radical when the compound is a salt. For pharmaceutical use, a soluble salt is preferred, for example, the sodium salt in which case X in the formula represents sodium.

In their acid form, the new compounds have a relatively low water-solubility. Although the acid form is suitable for oral administration, for parenteral administration a water-soluble material is desirable and hence it is preferable to employ the compounds in the form of their water-soluble salts.

The new acids can be prepared by condensing a 1,1-dicarbethoxycyclopentane with thiourea. The salts can be prepared from the corresponding acids by reacting the acid with a suitable base, for example in the case of the potassium salt, by reacting the acid with potassium alcoholate in anhydrous alcohol solution, or with potassium hydroxide in aqueous alcohol solution. Evaporation of the solution of the salt yields the dry salt.

A method of preparing the acid compounds of our invention is by the reactions indicated by the following equations, in which R, $R_1$ and $R_2$ have the same significance as hereinbefore and E represents an esterifying radical, for example, a lower alkyl radical.

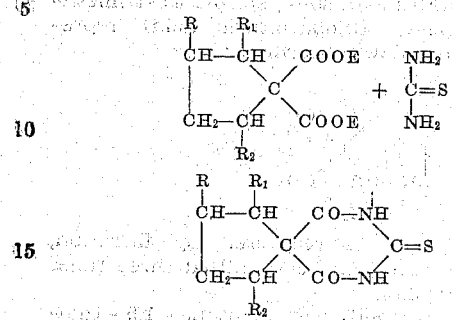

This is a continuation-in-part of application Serial No. 29,958, filed May 28, 1948, now abandoned.

This invention is further illustrated by the following specific examples.

EXAMPLE 1

Spiro(2,3,5 - trimethylcyclopentane - 1,5' - thiobarbituric acid) is prepared by the following sequence of reactions:

3-methylacetonylacetone (Yountz and Perkins, 1929, J. A. C. S. 51, 3514), dissolved in absolute ethanol, is reduced with hydrogen under pressure in the presence of Raney nickel catalyst. The reaction mixture is filtered, and the filtrate is distilled. The fraction boiling at 83°–90° C. at a pressure of about 1.0 mm. of mercury is recovered and consists essentially of 3-methyl-2,5-hexanediol. This is cooled and saturated with dry hydrogen bromide gas and allowed to stand overnight. It is then resaturated with hydrogen bromide gas and warmed at 50°–60° C. for about 7 hours. The mixture is then extracted, first with an equal volume of 48 percent hydrobromic acid solution and then with water, and then is washed with 10 percent sodium bicarbonate solution. The material is dried with magnesium sulfate, filtered, and distilled. The fraction boiling at 100°–116° C. at a pressure of about 20 mm. of mercury is recovered, and consists essentially of 3-methyl-2,5-dibromohexane.

To a solution of 44.6 g. of sodium in 670 cc. of absolute alcohol, 311 g. of ethyl malonate are added, and the solution is cooled on an ice bath and stirred (which usually causes a precipitate of the sodium derivative of ethyl malonate). To the cool mixture, 251 g. of 3-methyl-2,5-dibromohexane are added rapidly and the mixture is stirred for about an hour without heating. The mixture is then heated and refluxed for about 2 hours, and then distilled to remove the alcohol. Water is then added, which dissolves the sodium bromide formed in the reaction, and forms a separate layer. The aqueous layer is separated from the oily organic layer and extracted twice with benzene, and the benzene extracts are added to the organic layer. The combined organic mixture is dried with magnesium sulfate and distilled. The fraction boiling at 84°–108° C. at a pressure of about 3 mm. of mercury is recovered, and consists essentially of the 1,1-dicarbethoxy-2,3,5-trimethylcyclopentane.

To a solution of 62 g. of thiourea and 38 g. of sodium in 495 cc. of absolute methanol, are added 141 g. of 1,1-dicarbethoxy-2,3,5-trimethylcyclopentane. The resulting mixture is refluxed for 6 hours, and is then distilled to remove the methanol. The residue is cooled, water is added to it, and the aqueous mixture is extracted with ether to remove any alkali insoluble oil. The ether extract is discarded. The aqueous solution is neutralized with dilute hydrochloric acid whereupon there precipitates as a solid, spiro(2,3,5-trimethylcyclopentane-1,5'-thiobarbituric acid) represented by the following formula:

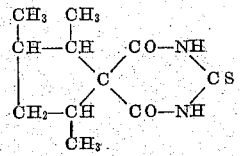

The precipitate is recovered by filtration, washed with water, and crystallized three times from dilute alcohol.

Spiro(2,3,5 - trimethylcyclopentane - 1,5 - thiobarbituric acid) thus prepared melted at about 175°–177° C. Analysis showed the presence of about 11.54 percent nitrogen as compared with the calculated amount of 11.67 percent nitrogen.

EXAMPLE 2

The sodium salt of spiro(2,3,5-trimethylcyclopentane-1,5'-thiobarbituric acid) is prepared as follows:

A solution of 33 g. of the spirobarbituric acid in 100 cc. of absolute alcohol is treated with a sufficient amount of solution of dilute sodium ethylate in ethanol to bring the solution to about pH 11. The solution is filtered, the filtrate is evaporated to dryness, and the residue thoroughly dried under vacuum at about 80° C. for several hours. The dry material is the desired sodium salt of spiro(2,3,5-trimethylcyclopentane-1,5'-thiobarbituric acid) and is represented by the following formula

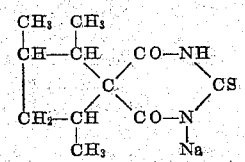

EXAMPLE 3

Spiro(2-ethyl-3,5-dimethylcyclopentane-1,5'-thiobarbituric acid) is prepared as follows:

400 g. of α-allyldiethyl ketone (Cope, Hoyle, and Heyl, 1941, J. A. C. S. 63, 1850) are added to a mixture of 375 g. of aluminum isopropoxide and 2000 cc. of isopropanol. The mixture is subjected to slow distillation through a fractionating column for about 11 hours. Most of the remaining isopropanol is then distilled off, and the residue is cooled and acidified with dilute sulfuric acid while maintaining the temperature below 40° C. The mixture now forms two layers, which are separated. The oily layer is washed with water and dried, as with magnesium sulfate, and is then distilled. The fraction boiling at 92–100° C. at a pressure of 58–60 mm. of mercury is recovered, and consists essentially of 4-methyl-1-heptene-5-ol.

This is converted to 4-methyl-2,5-dibromoheptane, as follows: To 390 g. of 4-methyl-1-heptene-5-ol are added 50 cc. of glacial acetic acid, 3 g. of diphenyl amine, and 20 cc. of water. The mixture is saturated with dry hydrogen bromide gas, with cooling, and then allowed to stand overnight. It is then resaturated with dry hydrogen bromide gas, with cooling, and then heated at 50°–60° C. for about 2 hours. Upon standing, the mixture forms two layers, which are separated, and the water layer is discarded. The other layer is washed with water and with sodium bicarbonate solution, and then dried with anhydrous potassium carbonate. The dried material is filtered, and fractionally distilled. The fraction boiling at 90°–100° C. at a pressure of 3–6 mm. of mercury is recovered, and consists essentially of 4-methyl-2,5-dibromoheptane.

To a solution of 50 g. of sodium in 750 cc. of absolute alcohol, 346 g. of ethyl malonate are added, and the mixture cooled and stirred. To this mixture, 294 g. of 4-methyl-2,5-dibromoheptane are added, and the resulting mixture is stirred for about 2 hours without external heating. The mixture is then heated and refluxed, with continued stirring, for about 5 hours, and is then distilled to remove the alcohol. Water is added to the residue to dissolve sodium bromide formed in the reaction. The aqueous solution forms a separate layer which is separated and extracted with ether. The ether extract is added to the oily layer, and the organic mixture is dried with magnesium sulfate and fractionally distilled. The material boiling at 138°–139° C. at a pressure of about 7 mm. of mercury is recovered and consists essentially of 1,1-dicarbethoxy-2-ethyl-3,5-dimethylcyclopentane.

To a solution of 16.3 g. of sodium and 27 g. of thiourea in 210 cc. of absolute methanol are added 63.6 g. of 1,1-dicarbethoxy-2-ethyl-3,5-dimethylcyclopentane, and the mixture is refluxed for about 6 hours. The methanol is distilled off, and the residue cooled and dissolved in water. The aqueous solution is extracted twice with ether to remove any unreacted ester and filtered. The filtrate is neutralized with dilute hydrochloric acid whereupon a precipitate of spiro(2-ethyl-3,5 - dimethylcyclopentane - 1,5' - thiobarbituric acid) forms. The thiobarbituric acid is represented by the following formula

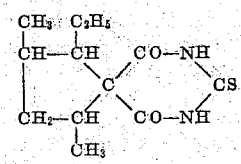

The thiobarbituric acid is filtered off and purified by dissolving it in dilute sodium hydroxide solution, treating the solution with decolorizing carbon, filtering off the carbon and reprecipitating the thiobarbituric acid by the addition of solid carbon dioxide. The thiobarbituric acid is filtered off, dissolved in absolute ethanol and the ethanol solution treated with an equal volume of water and cooled to about 0° C. The thiobarbituric acid separates in substantially pure, crystalline form. It is filtered off and dried.

Spiro(2 - ethyl - 3,5 - dimethylcyclopentane-1,5'-thiobarbituric acid) thus prepared melted at about 180–182° C. Analysis showed the presence of 11.11 percent nitrogen as compared with the calculated value of 11.02 percent nitrogen.

EXAMPLE 4

*Preparation of the sodium salt of spiro(2-ethyl-3,5-dimethylcyclopentane - 1,5' - thiobarbituric acid)*

A suspension of spiro(2-ethyl-3,5-dimethylcyclopentane-1,5'-thiobarbituric acid) in alcohol is treated with a sufficient amount of a solution of sodium ethylate in alcohol to bring the mixture to about pH 11. The mixture is then filtered, the filtrate evaporated to remove the alcohol, and the residue dried under vacuum at about 80° C. for several hours. The dry material is the desired sodium salt of spiro(2-ethyl-3,5-dimethylcyclopentane-1,5'-thiobarbituric acid) which is represented by the following formula

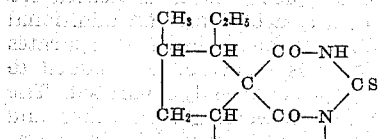

EXAMPLE 5

Spiro(2,3 - dimethyl - 5 - ethylcyclopentane-1,5'-thiobarbituric acid) represented by the formula

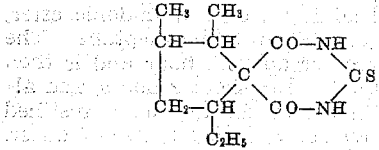

is prepared by generally the same series of reactions described in Example 3 for the preparation of spiro(2-ethyl - 3,5 - dimethylcyclopentane-1,5'-thiobarbituric acid), employing the sequential preparation of (1-methylallyl)-acetonitrile by condensation of 1-methylallyl chloride and acetonitrile in liquid ammonia with sodamide, reaction with ethylmagnesium bromide to form 5-methyl-6-heptene-3-one, reduction of the ketone with aluminum isopropoxide to form the corresponding alcohol, treatment with hydrogen bromide to form 2,5-dibromo-3-methylheptane, conversion of the dibromide into the cyclopentane-1,1-dicarboxylic ester, and condensation of the ester with thiourea to form the thiobarbituric acid.

The thiobarbituric acid is converted to its metallic salt by the procedure described in Examples 2 and 4.

EXAMPLE 6

*Preparation of spiro(2,5-diethylcyclopentane-1,5'-thiobarbituric acid)*

Spiro(2,5 - diethylcyclopentane - 1,5'-thiobarbituric acid) is prepared by the following sequence of reactions:

Acetylene dimagnesium bromide is prepared by passing acetylene into 3 mols of ethylmagnesium bromide in 1500 cc. of ether until the reaction is complete. The mixture is allowed to stand for several hours and to it are added dropwise and with stirring 3 mols (174 g.) of propionaldehyde. After the addition is complete the reaction mixture is stirred for about one-half hour at room temperature and is then poured into a mixture of dilute sulfuric acid and ice water. 4-octyne-3,6-diol separates as a supernatant oily layer. The oily layer is separated and the aqueous layer is extracted four times with ether to recover the 4-octyne-3,6-diol dissolved therein. The ether extracts are added to the 4-octyne-3,6-diol and the mixture is washed with sodium carbonate solution and dried with magnesium sulfate. The ether is removed by evaporation and the residue comprising 4-octyne-3,6-diol is purified by distillation in vacuo. The 4-octyne-3,6-diol boils at 90–95° C. at a pressure of about 1.0 mm. of mercury.

41 g. of 4-octyne-3,6-diol are dissolved in 200 cc. of 95 percent ethanol and 0.5 g. of platinum oxide are added. The mixture is hydrogenated with hydrogen at about 60 pounds pressure in an Adams machine until the calculated amount of hydrogen is adsorbed. The reaction mixture containing octane-3,6-diol is filtered to remove the catalyst, the alcohol is removed by distillation, and the residue comprising octane-3,6-diol is purified by distillation. Octane-3,6-diol boils at 101–102° C. at a pressure of about 3 mm. of mercury.

62 g. of octane-3,6-diol are dissolved in a mixture of 70 cc. of ether and 5 cc. of glacial acetic acid. The reaction mixture is refluxed and dry hydrogen bromide gas is passed into the refluxing mixture for about eight hours, during which time most of the ether evaporates from the mixture. The reaction mixture is allowed to stand at room temperature for about 12 hours and the aqueous layer which forms below the organic layer is separated and discarded. The organic layer is heated to about 100° C. and treated with dry hydrogen bromide gas for about 8 hours. The reaction mixture is allowed to stand for about 10 hours during which time a further quantity of aqueous layer appears below the organic layer. The aqueous layer is separated and the organic layer is washed successively with water and sodium bicarbonate solution, and treated with anhydrous potassium carbonate. The organic liquid comprising 3,6-dibromooctane is purified by distillation. 3,6-dibromooctane boils at about 63–70° C. at a pressure of about 1 mm. of mercury.

16 g. of sodium are dissolved in 240 cc. of absolute ethanol and to the solution are added 110 g. of ethyl malonate. The mixture is cooled and to the cool mixture are added 92.5 g. of 3,6-dibromooctane and the mixture is stirred and refluxed for about 5 hours. The ethanol is distilled from the mixture and the residue treated with water and the aqueous layer containing dissolved sodium bromide is separated and discarded. The organic layer comprising 1,1-dicarbethoxy-2,5-diethylcyclopentane is purified by distillation. 1,1-dicarbethoxy-2,5-diethylcyclopentane boils at about 85–87° C. at a pressure of about 1 mm. of mercury.

48 g. of 1,1-dicarbethoxy-2,5-diethylcyclopentane are added to a solution of 12.4 g. of sodium in 160 cc. of absolute methanol. 20.5 g. of thiourea are added to the solution and the mixture is refluxed for about 7 hours. The methanol is removed by evaporation and the residue containing spiro-(2,5-diethylcyclopentane-1,5'-thiobarbituric acid) as its sodium salt is dissolved in water. The aqueous solution is extracted several times with ether to remove any alkali insoluble material and the ether extracts discarded. The solution is acidified with dilute hydrochloric acid whereupon spiro(2,5 - diethylcyclopentane-1,5'-thiobarbituric) acid precipitates. The thiobarbituric acid is filtered off, washed with water and purified by repeated recrystillization from benzene. Spiro(2,5-diethylcyclopentane-1,5'-thiobarbituric acid) is represented by the following formula

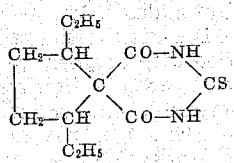

Spiro(2,5 - diethylcyclopentane-1,5'-thiobarbituric) acid thus prepared melts at about 162–164° C. Analysis showed the presence of 11.02 percent nitrogen as compared with the calculated value of 11.04 percent nitrogen.

EXAMPLE 7

The sodium salt of spiro(2,5-diethylcyclopentane-1,5'-thiobarbituric acid) is obtained by the procedure described in Examples 2 and 4. The sodium salt is represented by the formula

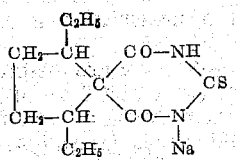

EXAMPLE 8

Preparation of spiro(2-methyl-5-ethylcyclopentane-1,5'-thiobarbituric acid)

Spiro(2-methyl-5-ethylcyclopentane-1,5'-thiobarbituric acid) is prepared by the following sequence of reactions.

Sodium amide is prepared by reacting 138 g. of metallic sodium with 6 liters of liquid ammonia. To the mixture are added slowly 246 g. of acetonitrile and the mixture is stirred for 10 minutes. To the vigorously stirred mixture are added as rapidly as possible, 726 g. of allyl bromide. The ammonia is evaporated and to the solid residue are added 1500 cc. of water and the mixture is filtered. The filtrate which comprises an organic layer containing allylacetonitrile is separated from the aqueous layer and the aqueous layer is extracted several times with ether to recover the allylacetonitrile dissolved therein. The ether extracts are added to the already separated allylacetonitrile, the mixture is dried with anhydrous magnesium sulfate, and the ether evaporated. The residue comprising allylacetonitrile is purified by distillation. It boils at about 142–150° C.

To 700 cc. of diisopropyl ether solution of ethyl magnesium bromide prepared from 48.6 g. of magnesium and 218 g. of ethyl bromide are added 81 g. of allylacetonitrile dissolved in 250 cc. of absolute diisopropyl ether. The mixture is refluxed for about 2 hours and allowed to stand at room temperature for about 8 hours. The reaction mixture is poured into a mixture of dilute hydrochloric acid and ice, and the ethereal layer which separates is recovered. The aqueous layer is extracted several times with benzene and the extracts added to the ethereal solution originally recovered. The solution which contains 1-heptene-5-one is dried over magnesium sulfate and the solvent evaporated. The residual 1-heptene-5-one is purified by distillation. It boils at about 142° C.

104 g. of 1-heptene-5-one dissolved in 350 cc. of anhydrous isopropanol are treated with 110 g. of aluminum isopropoxide. When the reaction is complete the isopropanol is distilled off and the residue is poured into 500 cc. of cold 6 N sulfuric acid. An organic layer comprising 1-heptene-5-ol appears and is separated. The aqueous layer is extracted several times with ether to recover the 1-heptene-5-ol dissolved therein. The ethereal extracts are added to the 1-heptene-5-ol and the mixture is washed with dilute sodium bicarbonate solution and water until the washings are neutral. The ether solution is dried with anhydrous magnesium sulfate, the ether evaporated and the residual 1-heptene-5-ol purified by distillation. It boils at 93–94° C. at a pressure of about 73 mm. of mercury.

A mixture of 79.1 g. of 1-heptene-5-ol, 0.5 g. if diphenyl amine, 10 cc. of glacial acetic acid and 5 cc. of distilled water is treated with 113 g. of anhydrous hydrogen bromide gas. The mixture is allowed to stand at room temperature for about 24 hours and is then heated for about one half hour and cooled. The mixture separates into two layers, the upper organic layer containing 2,5-dibromo heptane. The organic layer is separated and the aqueous layer is heated for about 30 minutes and cooled and an additional amount of 2,5-dibromo-heptane which separates as an organic layer is recovered and added to the 2,5-dibromo-heptane already separated. The 2,5-dibromo-heptane is washed with water and sodium bicarbonate solution and dried over anhydrous potassium carbonate. It is purified by distillation. 2,5-dibromo-heptane boils at 85–88° C. at a pressure of about 3 mm. of mercury.

To a cool solution of sodiomalonic ester prepared by reacting 25.2 g. of sodium in 410 cc. of ethanol and adding 206 g. of malonic ester, are added 141 g. of 2,5-dibromo-heptane. The mixture is stirred for about 1 hour and is then refluxed with stirring for about 2 hours, and allowed to cool. Most of the alcohol is distilled off and to the residue is added 1 liter of water. 1,1-dicarbethoxy-2-methyl- 5 - ethylcyclopentane appears as an oily layer. The oily layer is separated and the aqueous layer extracted several times with ether to recover any 1,1-dicarbethoxy-2-methyl-5-ethylcyclopentane dissolved therein. The ether extracts are combined with the diester already recovered, and the mixture is dried over magnesium sulfate. The ether is evaporated off and the residue comprising 1,1-dicarbethoxy-2-methyl-5-ethylcyclopentane is purified by distillation. It boils at 88–91° C. at a pressure of 0.2 mm. of mercury.

103.2 g. of 1,1-dicarbethoxy-2-methyl-5-ethylcyclopentane are added to a solution of 46 g. of thiourea in sodium methylate solution prepared from 27.9 g. of sodium and 350 cc. of absolute methanol. The solution is stirred and refluxed for about 6 hours. The methanol is removed by distillation and the residue which contains spiro(2 - methyl - 5 - ethylcyclopentane - 1,5' thiobarbituric acid) as its sodium salt is dissolved in about 500 cc. of water, and the solution extracted several times with ether to remove any unreacted ester. The solution is then acidified with hydrochloric acid. Spiro(2-methyl-5-ethylcyclopentane-1,5'-thiobarbituric acid) precipitates as a solid and is filtered off. The thiobarbituric acid is purified by dissolving it in dilute sodium hydroxide, treating the solution with decolorizing carbon and reprecipitating the thiobarbituric acid by adding an excess of solid carbon dioxide to neutralize the solution. The thiobarbituric acid which precipitates is further purified by recrystallization from dilute ethanol. Spiro(2-methyl-5-ethylcyclopentane-1,5'-thiobarbituric acid) is represented by the following formula

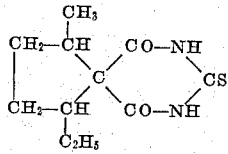

Spiro(2-methyl-5-ethylcyclopentane-1,5'-thiobarbituric acid) thus prepared melts at about 172–173° C. Analysis has shown the presence of 11.49 percent nitrogen as compared with the calculated value of 11.66 percent nitrogen.

EXAMPLE 9

The sodium salt of spiro(2-methyl-5-ethylcyclopentane-1,5'-thiobarbituric acid) is prepared by the procedure described in Examples 2 and 4. The sodium salt is represented by the formula

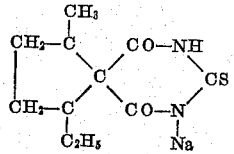

We claim as our invention:

1. A member of the group consisting of the spiro-thiobarbituric acids and salts thereof represented by the formula

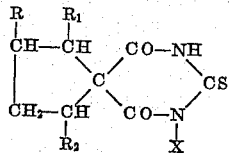

in which R is a member of the group consisting of hydrogen and methyl, and $R_1$ and $R_2$ are members of the group consisting of methyl and ethyl; and R is hydrogen when both $R_1$ and $R_2$ are ethyl; and R is methyl when both $R_1$ and $R_2$ are methyl; and X is a member of the group consisting of hydrogen and alkali metals.

2. A member of the group consisting of spiro-(2,5-diethylcyclopentane-1,5'-thiobarbituric acid) represented by the formula

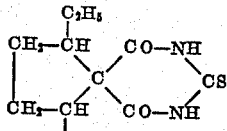

and its alkali metal salts.

3. A member of the group consisting of spiro-(2 - methyl - 5 - ethylcyclopentane-1,5'-thiobarbituric acid) represented by the formula

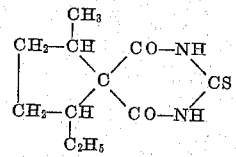

and its alkali metal salts.

4. The sodium salt of spiro(2-methyl-5-ethylcyclopentane-1,5'-thiobarbituric acid) represented by the formula

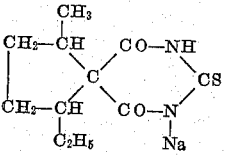

5. Spiro(2,5 - diethylcyclopentane - 1,5' - thiobarbituric acid) represented by the formula

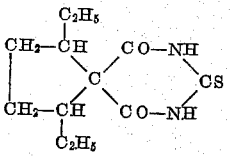

6. Spiro(2 - methyl-5-ethylcyclopentane-1,5'-thiobarbituric acid) represented by the formula

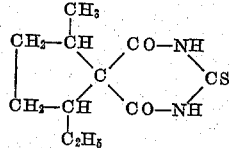

7. The sodium salt of spiro(2-ethyl-3,5-dimethylcyclopentane - 1,5' - thiobarbituric acid) represented by the formula

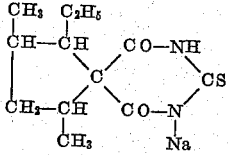

8. Spiro(2-ethyl - 3,5 - dimethylcyclopentane-1,5'-thiobarbituric acid) represented by the formula

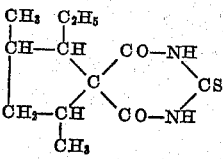

WILBUR J. DORAN.
EARLE M. VAN HEYNINGEN.

No references cited.